United States Patent
Taylor et al.

(10) Patent No.: US 8,553,068 B2
(45) Date of Patent: Oct. 8, 2013

(54) SWITCHED MULTIPOINT CONFERENCE USING LAYERED CODECS

(75) Inventors: Stuart A. Taylor, Berwyn, PA (US); Vikram Khurana, San Jose, CA (US); Charles U. Eckel, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 280 days.

(21) Appl. No.: 12/836,781

(22) Filed: Jul. 15, 2010

(65) Prior Publication Data

US 2012/0013705 A1   Jan. 19, 2012

(51) Int. Cl.
*H04N 7/14* (2006.01)
*H04Q 11/00* (2006.01)
*G06F 15/16* (2006.01)

(52) U.S. Cl.
USPC ........ 348/14.09; 370/260; 370/261; 709/204; 709/205

(58) Field of Classification Search
USPC .............. 348/14.09; 370/260, 261; 709/204, 709/205
See application file for complete search history.

(56) References Cited

U.S. PATENT DOCUMENTS

| | | |
|---|---|---|
| 6,614,845 B1 | 9/2003 | Azadegan |
| 7,593,032 B2 | 9/2009 | Civanlar |
| 2005/0024487 A1 * | 2/2005 | Chen ........................... 348/14.13 |
| 2006/0023748 A1 * | 2/2006 | Chandhok et al. ............ 370/469 |
| 2008/0218586 A1 | 9/2008 | Graham et al. |
| 2009/0030976 A1 * | 1/2009 | Shukla et al. ................. 709/203 |
| 2012/0002001 A1 * | 1/2012 | Prentice ..................... 348/14.08 |

FOREIGN PATENT DOCUMENTS

WO    WO 03065720 A1 *  8/2003

OTHER PUBLICATIONS

Heiko Schwarz et al., Overview of the Scalable Video Coding Extension of the H.264/AVC Standard, *IEEE Transactions on Circuits and Systems for Video Technology*, vol. 17, No. 9, Sep. 2007.
Wenger et al., Standards track: draft-ietf-avt-rtp-svc-21—RTP Payload Format for SVC Video, Apr. 2010, accessed via http://tools.ietf.org/html/draft-ietf-avt-rtp-svc-21.

* cited by examiner

*Primary Examiner* — Duc Nguyen
*Assistant Examiner* — Theodore Ndje
(74) *Attorney, Agent, or Firm* — Brinks Hofer Gilson & Lione

(57) ABSTRACT

In one implementation, a conference bridge connects endpoints in a media conference. The various endpoints may have a wide range of video capabilities and audio capabilities. The video conference bridge learns the video capabilities of the endpoints and formulates a media plan based on these capabilities. The media plan instructs the endpoints on the types of media streams to produce. The video conference bridge may shape a media stream received from one of the endpoints by removing one or more layers. Accordingly, each endpoint decodes only the media streams that can be encoded by another endpoint and receives the best possible media stream from each endpoint.

20 Claims, 6 Drawing Sheets

SWITCHED MULTIPOINT CONFERENCE USING LAYERED CODECS

FIELD

The present embodiments relate to video streams.

BACKGROUND

A video conference bridge receives video streams from multiple endpoints and converges the video stream into a single feed. The video conference bridge sends the single feed to the multiple endpoints. A video conference bridge may also be referred to as a multipoint control unit or a multipoint conferencing unit (MCU). The endpoints are video conferencing devices (e.g. personal computer including monitor and camera).

The various endpoints may have varying capabilities. The video conference bridge may include hardware and/or software capable of transcoding the received video into a single output that all of the endpoints are capable of displaying. However, this requires high processing and other hardware resources. In addition, recent developments in video technologies have resulted in an increasing number of video stream formats. Accordingly, video conference bridges are cost prohibitive for many users.

DETAILED DESCRIPTION

Overview

Figure 1:
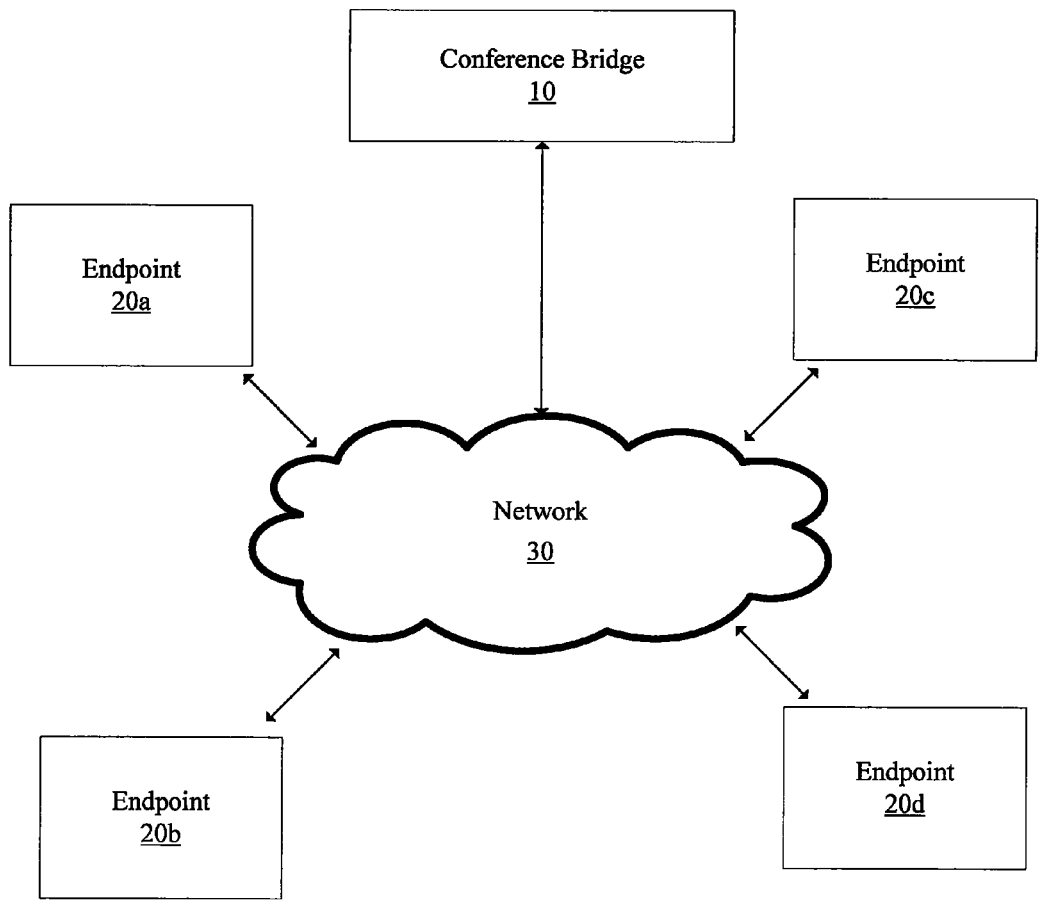
FIG. 1 illustrates one embodiment of a media conference.

A video conference bridge connects endpoints in a media conference. A goal of the video conference bridge is to have each sending endpoint send the highest quality media that the receiving endpoints are capable of rendering, and for each receiving endpoint to receive the highest quality media that it is capable of rendering. In doing so, the video conference bridge strives to minimize or eliminate the need for media transcoding, but to minimize the processing cost and the latency of propagating the media from sender to receiver.

The various endpoints may have a wide range of video capabilities and audio capabilities. The video capabilities may include resolution, frame rate, or quality capabilities. The various endpoints produce video streams according to their video capabilities. A particular media stream may be encoded in layers. The layers may include a base layer encoded with the basic video capabilities as well as one or more enhancement layers which incrementally increase the size, frame rate, and/or quality.

However, in some situations, an endpoint may produce a media stream with layers that no other endpoint can utilize. The video conference bridge learns the video capabilities of the endpoints and formulates a media plan based on these capabilities. The media plan instructs the endpoints on the types of media streams to produce. The video conference bridge may shape the received media streams by removing one or more layers so that the output media stream sent to each endpoint is optimized. The media stream may include encoded video and/or encoded audio. During the course of a conference, the video conference bridge may at any time update the media plan in response to changes in conditions, such as the addition or removal of an endpoint.

In one aspect, a method includes receiving data related to a media capability of each of a plurality of conference devices, defining a media layering plan based on the media capability of each of the plurality of conference devices, sending a request to the plurality of conference devices based on the media layering plan, receiving an input media stream from at least one of the plurality of conference devices, and removing a layer from the input media stream according to the media layering plan.

In a second aspect, an apparatus comprises a communications interface and a controller. The communication interface is configured to receive data related to a media capability of each of a plurality of conference devices. The controller is configured to define, based on the media capability of each of the plurality of conference devices, a media layering plan used in a request to the plurality of conference devices, wherein the controller receives an input media stream received from a first conference device of the plurality of conference devices, shapes the input media stream, and outputs the shaped media stream to a second conference device of the plurality of conference devices.

Example Embodiments

Video conferencing bridges or multipoint conferencing units (MCUs) may operate through either transcoding or switching. A transcoding video conference bridge decodes the media stream from one or more endpoints and re-encodes a data stream for one or more endpoints. The video conference bridge encodes a media stream for each endpoint including the media stream from all other endpoints. Transcoding video conference bridges require significant processing and other hardware capabilities.

A switching video conference bridge, on the other hand, transmits the video and/or audio of selected endpoint(s) to the other endpoints based on the active speaker. In the case of more than one active speaker, plural endpoints would be selected by the switching video conference bridge. The determination may involve quantitative measures of voice activity. Alternatively, the quantitative measure of voice activity may be performed by the endpoints prior to transmission of the corresponding media stream.

H.264-SVC and H.264-AVC are video compression standards. H.264-AVC is formally known as ISO/IEC 14496-10-MPEG-4 Part 10, Advanced Video Coding, completed May 2003 available at http://www.itu.int. Scalable Video Coding (SVC or H.264-SVC) is an extension found at Appendix G of H.264-AVC, completed November 2008, also available at http://www.itu.int. The SVC extension enables the encoding of video streams that contain one or more subset video streams, which may be referred to as layers. Video conferences may include a mix of H.264-SVC and H.264-AVC endpoints. A video conference bridge should provide the best possible experience for both AVC endpoints and SVC endpoints.

A switching video conference bridge negotiates with each participating endpoint so that each endpoint produces a media stream that the other endpoints can display. The role of the switching video conference bridge is to negotiate the input media streams and replicate the input media streams to the appropriate outputs. In one example, only the input media streams representing the current speaker or presenter will be active. More complex replication models are possible but may not affect the negotiation.

When all of the endpoints use H.264-AVC, the endpoints use a single H.264 level that all of the endpoints can decode. When there is a heterogeneous mix of endpoints in the conference, such as one capable of displaying common intermediate format (CIF), another capable of displaying quarter common intermediate format (QCIF), and a third capable of displaying 4× common intermediate format (4CIF), the endpoints have agreed to encode at the level of the least capable endpoint. The downside of this approach is that all the endpoints are reduced to sending and receiving QCIF or another least capable format. The waste of resources is further illustrated where there are ten 4CIF endpoints and only one QCIF endpoint, and the sole QCIF endpoint is not an active participant.

SVC endpoints are capable of generating a multilayer media stream. The media stream is scalable in that one or more of the layers may be removed and the resulting media stream is a valid media stream. In some circumstances, one or more layers combine to form all of the information to provide the valid media stream. For example, a multilayer media stream may include three layers: A, B, and C. Layer A may provide video in QCIF resolution. Layers A and B may combine to provide video in CIF resolution. Layers A, B, and C may combine to provide video in 4CIF resolution.

In an alternative implementation, a single layer may include all of the information necessary to provide the valid media stream. For example, layer A may provide video in QCIF resolution, layer B may independently provide video in CIF resolution, and layer C may independently provide video in 4CIF resolution.

In another example, a multilayer media stream may implement high definition (HD) standards and standard definition (SD) standards with two layers: layer A and layer B. Layer A may include all of the information necessary to provide an SD media stream and layer B may include all of the additional information necessary to provide an HD media stream. In other words, a base layer (layer A) provides the SD media stream and the combination of the base layer and the enhancement layer (layer B) provides the HD media stream.

The multilayer media stream includes a base layer and one or more enhanced layers. The various layers may have different media capabilities in one or more of the areas of video resolution, frame rate, and video quality. The base layer may have the lowest media rating or capabilities in one or more of the areas. For example, the base layer may have a lower resolution than all of the enhanced layers.

In the context of a video conference bridge without transcoding capabilities and employing multilayer media stream or multilayer codecs, the examples below provide a video conference bridge configured to negotiate the media stream characteristics in a manner that achieves the optimum end user experience for each endpoint. The video conference bridge may request data regarding the media capabilities of the endpoints and design a media layering plan based on the capabilities of the endpoints. The endpoints can then follow the media layering plan to produce a multilayer media stream including only those layers that will be used by at least one other endpoint. Each endpoint may receive the layers available and appropriate for that endpoint.

FIG. 1 illustrates one embodiment of a media conference. The media conference is conducted by a conference bridge 10 between participants at endpoints 20a-d via a communication network 30. The communication network 30 may include a public switched telephone network (PSTN), the Internet, a local area network (LAN), a wide area network (WAN), a wired network, a wireless network, a cellular network, a combination thereof, or any other network suitable for carrying media. The communication network 30 may include one or more intermediary components, such as gateways, routers, switches, hubs, or other component.

The endpoints 20a-d may be remotely located or one or more of the endpoints 20a-d may be at the same or nearby locations. The endpoints 20a-d may be implemented using any combination of device suitable for video conferencing. For example, one or more of the endpoints 20a-d may be a personal computer, an internet protocol (IP) phone, a video phone, a dedicated video conferencing system, or other devices including equipment suitable for establishing and supporting a video conference. The endpoints 20a-d may be configured to employ single stream transmission (SST), multiple stream transmission (MST), or combinations of SST and MST. The media may be transmitted via multicast or unicast.

Equipment suitable for establishing and supporting a video conference may include a display, a speaker, a camera, and/or a microphone. The display may be a cathode ray tube (CRT) monitor, a liquid crystal display (LCD) panel, or another type of display. The endpoints 20a-d may also include one or more network interfaces, memories, processors, codecs, and other hardware and software suitable for establishing and supporting video conferences. The endpoints 20a-d are capable of producing a media stream, including video and/or audio, that originates with the camera and/or microphone and is compressed and encoded by the processors or codecs and transmitted to the communication network 30 using network interfaces.

Figure 2:
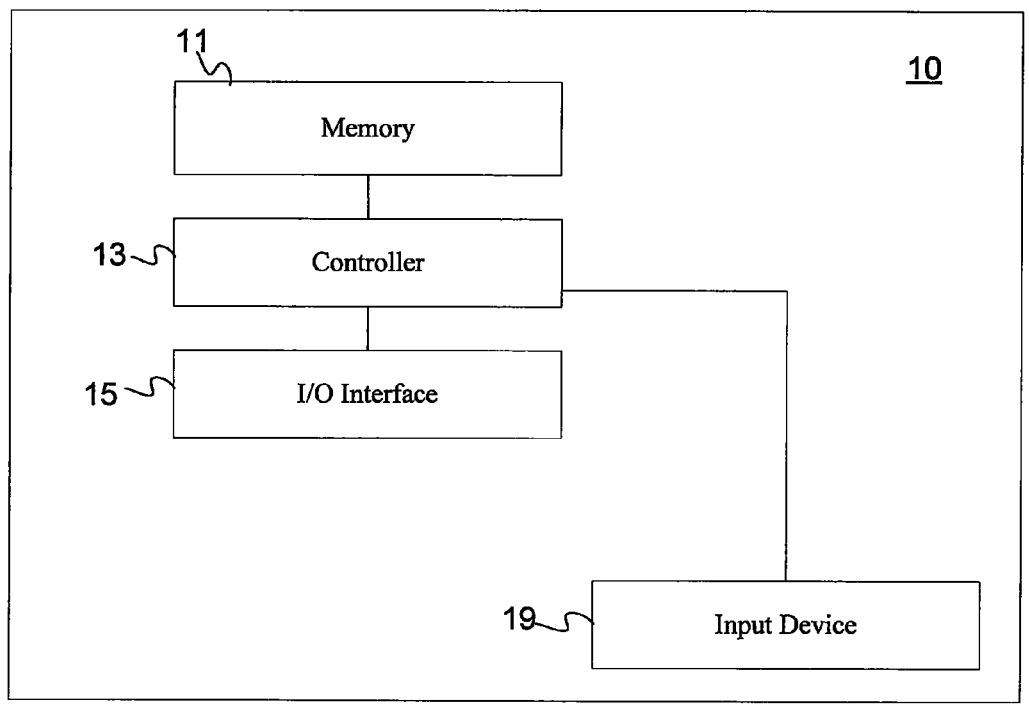
FIG. 2 illustrates one embodiment of a conference bridge.

FIG. 2 illustrates one embodiment of a conference bridge 10. The conference bridge 10 includes a memory 11, a controller 13, and an input/output (I/O) interface 15. Optionally, conference bridge 10 may include an input device 19.

The memory 11 may be a volatile memory or a non-volatile memory. The memory 11 may include one or more of a read only memory (ROM), dynamic random access memory (DRAM), a static random access memory (SRAM), a programmable random access memory (PROM), a flash memory, an electronic erasable program read only memory (EEPROM), static random access memory (RAM), or other type of memory. The memory 11 may include an optical, magnetic (hard drive) or any other form of data storage device. The memory 11 may be located in a remote device or removable, such as a secure digital (SD) memory card.

The memory 11 may store computer executable instructions. The controller 13 may execute computer executable instructions. The computer executable instructions may be included in computer code. The computer code may be stored in the memory 11. The computer code may be written in any computer language, such as C, C++, C#, Java, Pascal, Visual Basic, Perl, HyperText Markup Language (HTML), JavaScript, assembly language, extensible markup language (XML) and any combination thereof.

The computer code may be logic encoded in one or more tangible media or one or more non-transitory tangible media for execution by the controller 13. Logic encoded in one or more tangible media for execution may be defined as instructions that are executable by the controller 13 and that are provided on the computer-readable storage media, memories, or a combination thereof. Instructions for instructing a network device may be stored on any logic. As used herein, "logic", includes but is not limited to hardware, firmware, software in execution on a machine, and/or combinations of each to perform a function(s) or an action(s), and/or to cause a function or action from another logic, method, and/or system. Logic may include, for example, a software controlled microprocessor, an ASIC, an analog circuit, a digital circuit, a programmed logic device, and a memory device containing instructions.

The instructions may be stored on any computer readable medium. A computer readable medium may include a floppy disk, a hard disk, an application specific integrated circuit (ASIC), a compact disk CD, other optical medium, a random access memory (RAM), a read only memory (ROM), a memory chip or card, a memory stick, and other media from which a computer, a processor or other electronic device can read.

The controller 13 may comprise a general processor, digital signal processor, application specific integrated circuit, field programmable gate array, analog circuit, digital circuit, combinations thereof, or other now known or later developed processor. The controller 13 may be a single device or combinations of devices, such as associated with a network or distributed processing. Any of various processing strategies may be used, such as multi-processing, multi-tasking, parallel processing, remote processing, centralized processing or the like. The controller 13 may be responsive to, configured to or operable to execute instructions stored as part of software, hardware, integrated circuits, firmware, micro-code or the like. The functions, acts, methods or tasks illustrated in the figures or described herein may be performed by the controller 13 executing instructions stored in the memory 11. The functions, acts, methods or tasks are independent of the particular type of instructions set, storage media, processor or processing strategy and may be performed by software, hardware, integrated circuits, firmware, micro-code and the like, operating alone or in combination. The instructions are for implementing the processes, techniques, methods, or acts described herein.

The I/O interface 15 may include any operable connection. An operable connection may be one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels may be used to create an operable connection. For example, the I/O interface 15 may comprise a first communication interface devoted to sending data, packets, or datagrams and a second communication interface devoted to receiving data, packets, or datagrams. Alternatively, the I/O interface 15 may be implemented using a single communication interface.

The input device 19 allows a user or administrator to input commands to the conference bridge 10. The input device 19 may be a keyboard, trackball, touch pad, a mouse, or other user input. Alternatively, the input device 19 may be provided remotely at another terminal by way of the communication network 30, such as the Internet.

Figure 3:
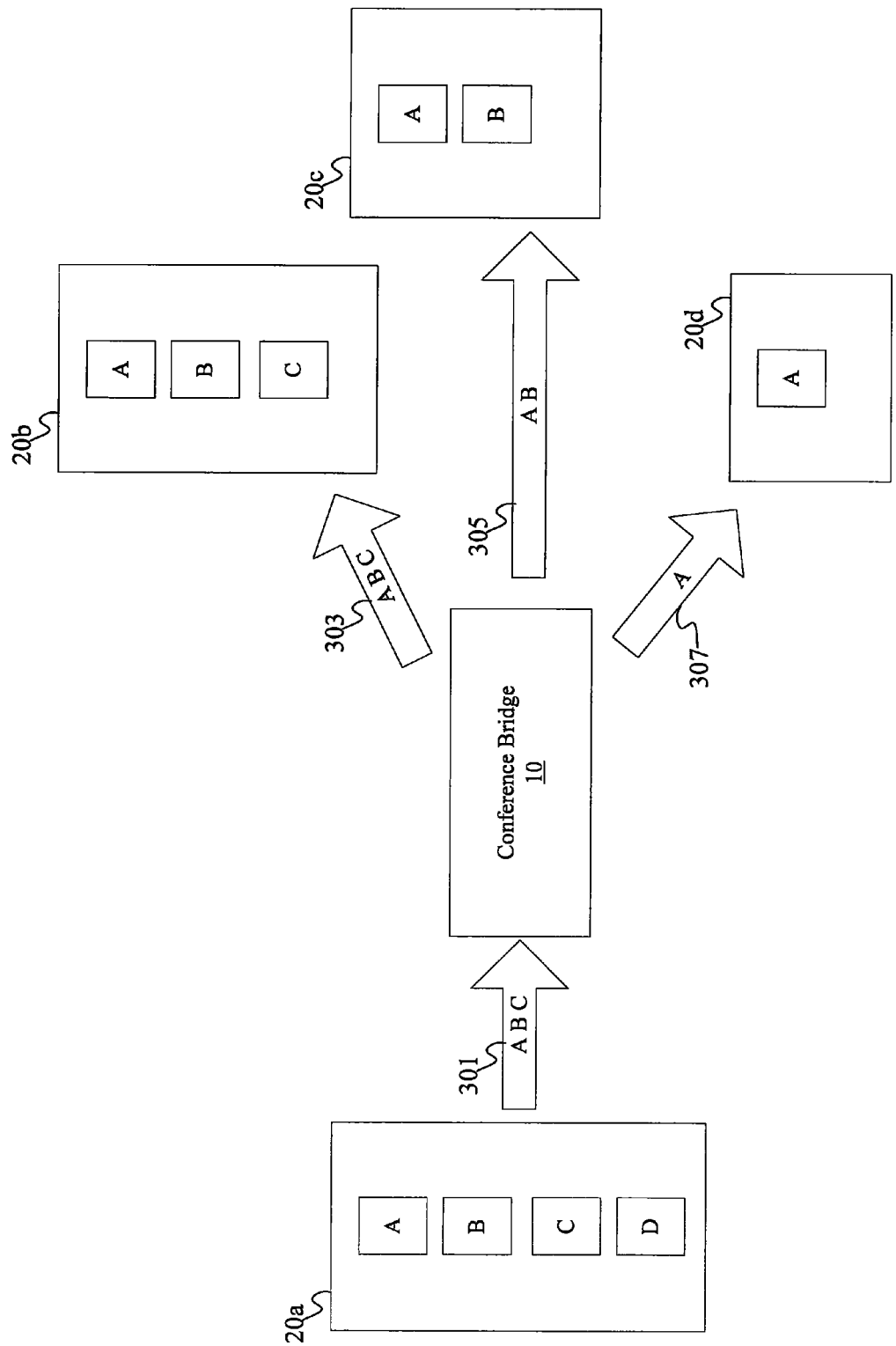
FIG. 3 illustrates one embodiment of a media conference using media streams with multiple layers in a first state.

FIG. 3 illustrates one embodiment of the conference bridge 10 of FIG. 2 using media streams with multiple layers. In this example, the endpoints 20a-d have varying media capabilities. The media capabilities are represented in FIG. 3 by A, B, C, and D. The media capabilities may be resolutions. For example, A represents QCIF (176×144), B represents CIF (352×288), C represents 4CIF (704×576) and D represents 16CIF (1408×1152). Other resolutions may be possible. One possible algorithm for the scalability of video resolution, referred to as spatial scalability in H.264-SVC includes inter-layer predictions so that the information encoded in the based layer may be used by the enhancement layers.

In this switching video conference, endpoint 20a is the active speaker or presenter. Endpoint 20a is capable of displaying video at resolutions QCIF, CIF, 4CIF, and 16CIF, as shown by A, B, C, and D. Endpoint 20b is capable of displaying video at resolutions QCIF, CIF, and 4CIF, as shown by A, B, and C. Endpoint 20c is capable of displaying video at resolutions QCIF or CIF, as shown by A and B. Endpoint 20d is capable displaying video only at resolution QCIF, as shown by A.

Alternatively or in addition, the media capabilities may include one or more of processing power, memory, display size, frame rate, video quality, bandwidth, and macroblock rate. For example, regarding frame rate, an endpoint may have a media capability measured in frames per second. Possible frame rates are 60 frames per second, 20 frames per second, and 10 frames per second. Other possible frame rates may be provided.

One possible algorithm for the scalability of frame rates, referred to as temporal scalability, is included in H.264-SVC. For example, temporal scalability may be provided in a media stream with three layers. An endpoint capable of displaying the full frame rate receives and decodes all three layers. An endpoint capable of displaying ⅓ of the full frame rate receives and decodes two of the layers. An endpoint capable of displaying ⅑ of the full frame rate receives and decodes only the base layer.

As another example, regarding resolution, an endpoint may have a media capability, in addition or in the alternative to the resolutions discussed above, relating to HD standards and SD. Example HD standard resolutions include 720p, 1080p, and 1080i. Example SD standard resolutions include 480p, 480i, 576p, and 576i.

As another example, regarding processing power, an endpoint may have a media capability measured in clock speed of a central processing unit (CPU). Example processing powers are 1 GHz and 2 GHz.

As another example, regarding display size, an endpoint may have a media capability measured in physical size. For example, a video conference center may have a display as large as 60 inches, a laptop may have a display of 17 inches, and a mobile device may have a display of 7 inches or smaller.

As another example, an endpoint may have a media capability indicative of video quality or fidelity. Quality is generally the objective video degradation. Quality may be measured on the pixel level. One metric use to evaluate video quality is peak signal-to-noise ratio (PSNR). Example values of video quality in PSNR include 20 dB and 30 dB. One possible algorithm for the scalability of quality or fidelity, referred to as quality scalability in H.264-SVC includes inter-layer predictions so that the information encoded in the based layer may be used by the enhancement layers.

Quality may be indicated by the sampling ratio. The Y'CbCr color space represents luma (Y), blue difference chroma (Cb), and red difference chroma (Cr). A sampling ratio may be expressed as a three part ratio Y':Cb:Cr, describing the number of luminance and chrominance samples. Some video compression standards take advantage of the human eye's sensitivity to color over luminance. For example, 4:2:2 sampling requires only two-thirds of the bandwidth of 4:4:4 sampling but results in negligible perceived loss of quality by the human eye. However, defects may become apparent as the video is displayed at a larger size. Example sampling ratios include 4:4:4, 4:2:2, 4:2:1, 4:1:1, 4:2:0, 4:1:0, and 3:1:1.

As another example, regarding bandwidth, an endpoint may have a media capability indicative of the bandwidth of its network connection. The endpoint may detect or otherwise have information regarding bandwidth. Example values of bandwidth include 1 kilobit/second, 1 megabit/second, and 1 gigabit/second.

As another example, endpoints may have a media capability related to macroblock rate. A macroblock is a block of pixels, such as 8×8 pixels or 16×16 pixels. Given that other resources remain constant, an increase in macroblock rate indicates a higher possible resolution. Example values of macroblock rate include 500 or 1000 macroblocks per second.

Each endpoint 20a-b has media capabilities in some combination of all of the above capabilities related to processing power, memory, display size, frame rate, video quality, bandwidth, and macroblock rate. Numerous combinations of the various media capabilities are possible. The conference bridge 10 is configured to define the media layering plan based on one or more of the various media capabilities.

The conference bridge 10 receives data related to a media capability of the endpoints 20a-d. The conference bridge 10 designs a media layering plan, based on the media capabilities, which will best serve the needs of endpoints 20a-d. The conference bridge 10 distributes the media layering plan to the endpoints 20a-d in the form of a request for each individual endpoint to deliver a media stream in a particular format according to the media layering plan.

The endpoints 20a-d produce a media stream that is consistent with the media layering plan. For example, endpoint 20a produces a media stream according to the capabilities of each of the other endpoints 20b-d. As shown in FIG. 3, endpoint 20a produces a media stream 301 including media layers A, B, and C even though endpoint 20a has capabilities A, B, C, and D. Since D may not be used by the other endpoints, layer D is not provided. Alternatively, layer D may be provided at a later time, such as when additional endpoints are added to the media conference.

The conference bridge 10 is configured to shape or adjust the media streams it receives from each of endpoints 20a-d by removing layers. Specifically, the conference bridge 10 receives media stream 301 from endpoint 20a and removes layers to match the media capabilities of each of the other endpoints in the conference. For example, the conference bridge 10 removes layer C as the conference bridge 10 produces output media stream 305 destined for endpoint 20c. Similarly, the conference bridge 10 removes layers B and C as the conference bridge 10 produces output media stream 307 destined for endpoint 20d.

As illustrated by FIG. 3, the conference bridge 10 does not shape media stream 301 as conference bridge 10 produces output media stream 303 destined for endpoint 20b because endpoint 20b has media capabilities A, B, and C. In the example shown by FIG. 3, layer A may be referred to as the base layer. The base layer is compatible with each of endpoints 20a-d. Layers B and C may be referred to as enhancement layers, and layer C may be referred to as the top enhancement layer.

Figure 4:
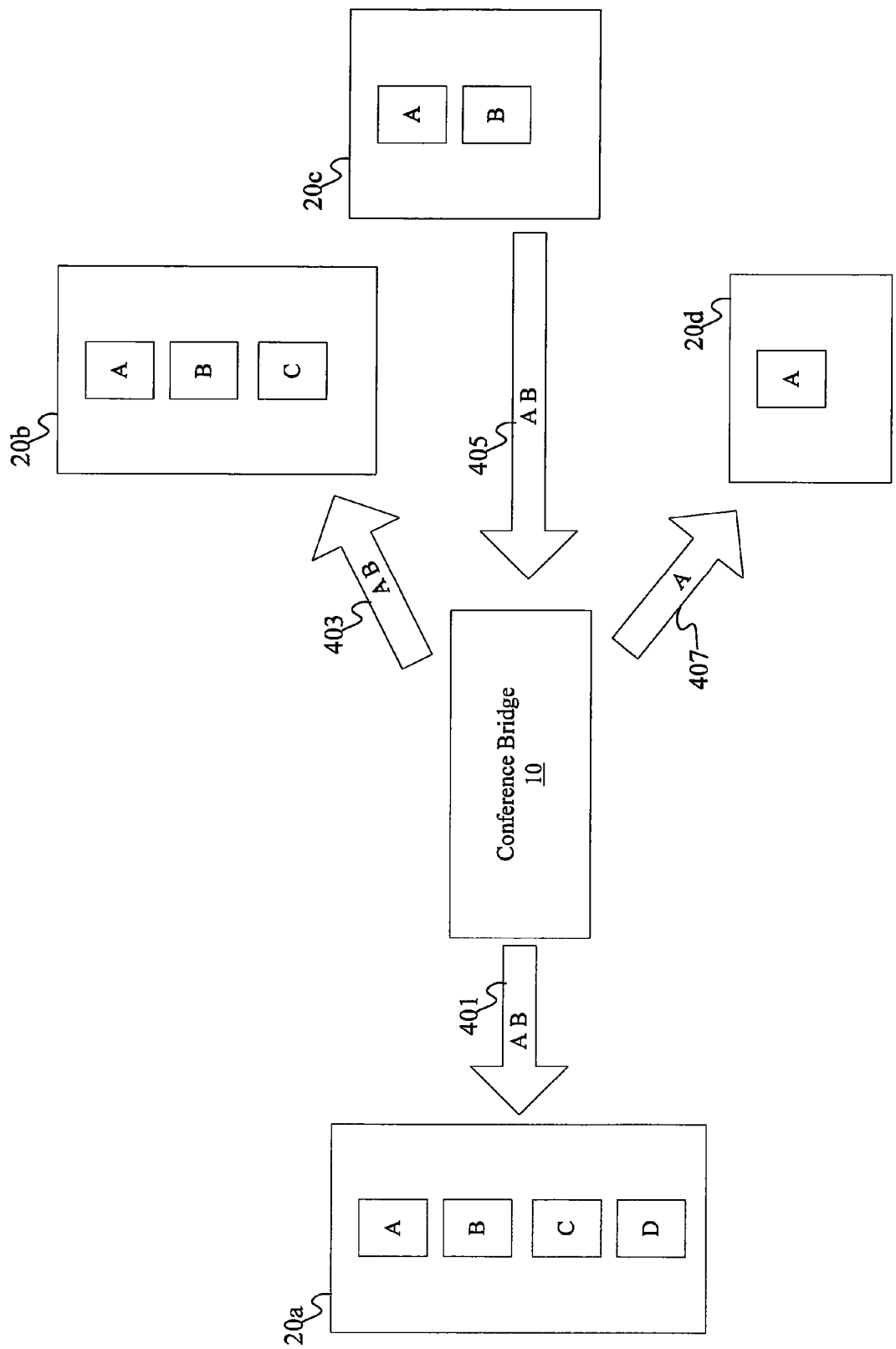
FIG. 4 illustrates the embodiment of FIG. 3 in a second state.

FIG. 4 illustrates the embodiment of FIG. 3 in a second state. Endpoint 20c is now the active speaker or presenter. Endpoint 20a is capable of displaying video at resolutions QCIF, CIF, 4CIF, and 16CIF, as shown by A, B, C, and D. Endpoint 20b is capable of displaying video at resolutions QCIF, CIF, and 4CIF, as shown by A, B, and C. Endpoint 20c is capable of displaying video at resolutions QCIF or CIF, as shown by A and B. Endpoint 20d is capable displaying video only at resolution QCIF, as shown by A.

As shown by FIG. 4, endpoint 20c produces a media stream that is consistent with the media layering plan by producing a media stream 405 including media layers A and B. The conference bridge 10 is configured to shape or adjust the media streams received from endpoint 20c by removing layers. For example, the conference bridge 10 removes layer B as the conference bridge 10 produces output media stream 407 destined for endpoint 20d. Endpoints 20a and 20b receive media stream 401 and media stream 403, respectively, including media layers A and B, unaltered by the conference bridge 10.

The negotiation between conference bridge 10 and endpoints 20a-d may be implemented using session initiation protocol (SIP) and the offer/answer model defined in RFC 3264, published June 2002 and available at http://www.rfc-editor.org/rfc/rfc3264.txt. For example, two transactions may be used. The conference bridge 10 offers to send transmission of the media layering plan to endpoints 20a-d using the "sendonly" marker. The transmission may be unicast or multicast. Each of the endpoints 20a-d responds with an indication of the respective endpoint's media capabilities.

Next, the conference bridge 10 receives the indication of the media capabilities of endpoints 20a-d and modifies the media layering plan according to the reported endpoints' media capabilities. The media layering includes the capabilities of the endpoints in any combination of the areas of processing power, memory, display size, frame rate, video quality, bandwidth, macroblock rate and audio format. In one example, the media layering plan may include an entry for the highest resolution capability of each endpoint, the fastest frame rate capability of each endpoint, and the highest quality or fidelity capability of each endpoint.

The modified media layering plan is transmitted to endpoints 20a-d again. This time the conference bridge 10 uses the "send/receive" marker. The endpoints 20a-d respond with a media stream that is compatible with the media layering plan.

The conference bridge 10 is also configured to accommodate a mixture of endpoints in which some endpoints include only layered codecs, such as H.264 SVC, and other endpoints include only non-layered codecs, such as H.264-AVC. In such a mixture, the base layer of the media stream may be compatible with the non-layered codec. For optimum performance in a mixed environment, the layering plan devised by the conference bridge 10 defines the base layer to match the capabilities of the least capable endpoint in the conference.

Using the SIP offer/answer model, the conference bridge 10 offers both layered and non-layered codecs to all of the endpoints 20a-d in the media conference. The offer includes a preference for the layered codec. The conference bridge 10 defines the media layering so that the base layer matches the capabilities of the least capable endpoint in the conference, whether that endpoint uses a layered or non-layered codec. This same media capability may be used in the subsequent offer to the non-layered-codec endpoint.

The media conferences shown in FIGS. 2-5 may change as new endpoints enter the conference. The conference bridge 10 watches for new endpoints. When the new endpoint has a media capability that would affect the media layering plan, the conference bridge 10 is configured to change the media layer plan in real time. When the new endpoint is now the least capable for a particular media capability, the conference bridge 10 sends a new set of parameters to all endpoints. Along those same lines, when the least capable endpoint drops out of the media conference, the conference bridge 10 updates the media layering plan, which may improve the conference for the other endpoints. Alternatively, the media layer plan stays the same even when an endpoint drops out or is added.

In one implementation, the conference bridge 10 may be configured with a minimum capability set. The minimum capability set may be defined by a user through the input device 19. Accordingly, the conference bridge 10 may remove an endpoint from the media conference if its media capabilities do not meet (or fall below) the minimal capability. In addition, the minimum capability set may be defined by one of the endpoints 20a-d. For example, the endpoint that initiates the media conference, which may be referred to as the lead endpoint, may instruct the conference bridge 10 to set the minimum capability set according to the media capabilities of the lead endpoint. Accordingly, the conference bridge 10 may not admit an endpoint from the media conference if its media capabilities do not meet (or fall below) the minimal capability.

Figure 5:
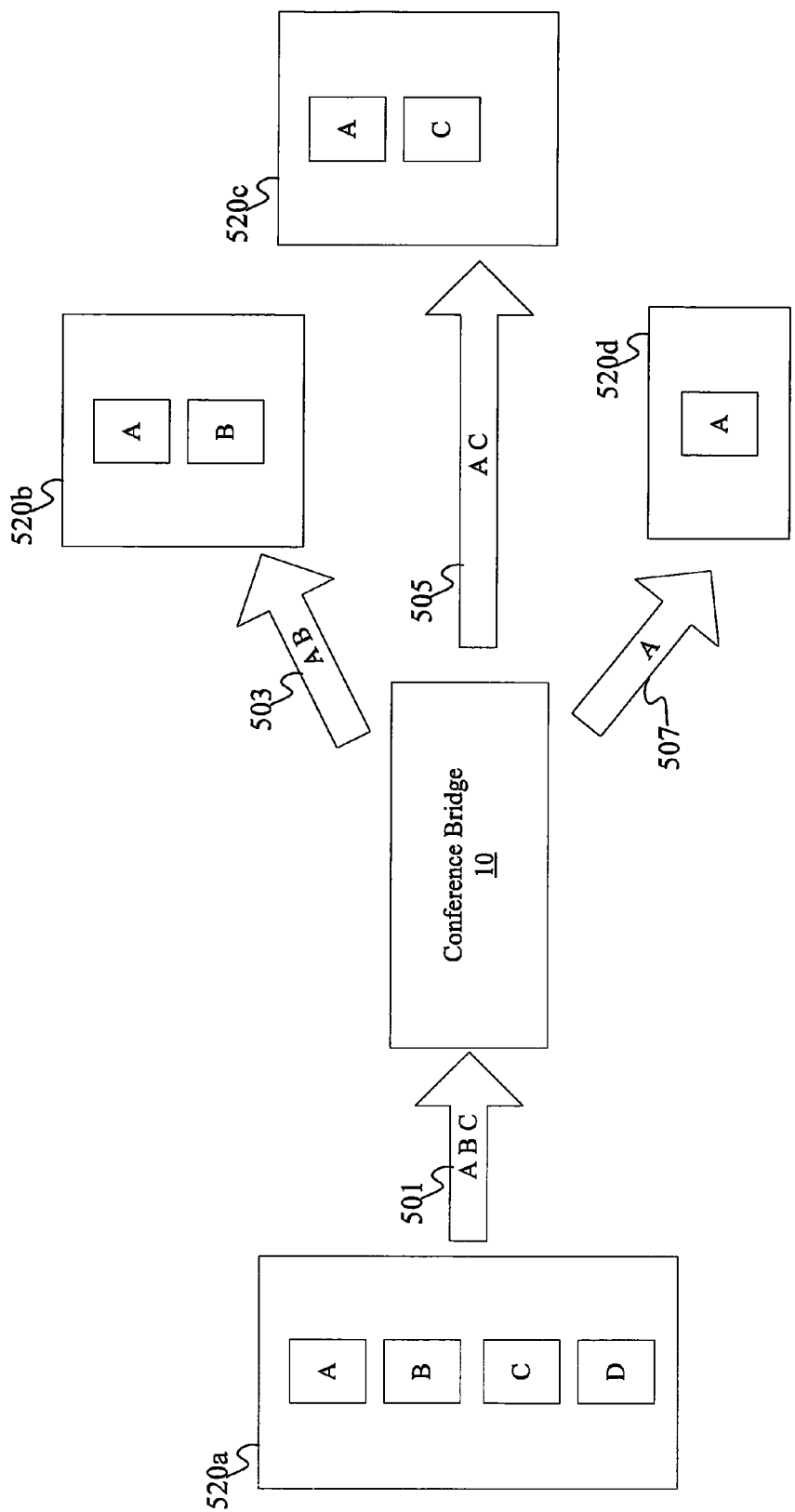
FIG. 5 illustrates one embodiment of a media conference using endpoints with intermediate combinations of media capabilities.

FIG. 5 illustrates one embodiment of a media conference using endpoints with intermediate capabilities. The aggregate of all of the media capabilities match the capabilities of the most capable endpoint, but intermediate combinations are possible. In the example shown in FIG. 5, endpoint 520a is the most capable endpoint, and all endpoints have media capability A to match the least capable endpoint 520d. However, intermediate endpoints 520b and 520c have mutually exclusive media capabilities. The conference bridge 10 is configured to adapt the media layering plan to the mutually exclusive media capabilities of intermediate endpoints 520b and 520c.

For example, when the endpoint 520a is the active speaker, media stream 501 including layers A, B, and C is transmitted to the conference bridge 10. The conference bridge 10 removes layer B as the conference bridge 10 produces output media stream 505 destined for endpoint 520c. The conference bridge 10 removes layer C as the conference bridge 10 produces output media stream 503 destined for endpoint 520b. Under the media layering plan, the conference bridge 10 sends media stream 507 to endpoint 520d.

When endpoint 520b is the active speaker in the media conference of FIG. 5, the conference bridge will shape the output media streams so that endpoints 520c and 520d receive a media stream with only layer A.

Figure 6:
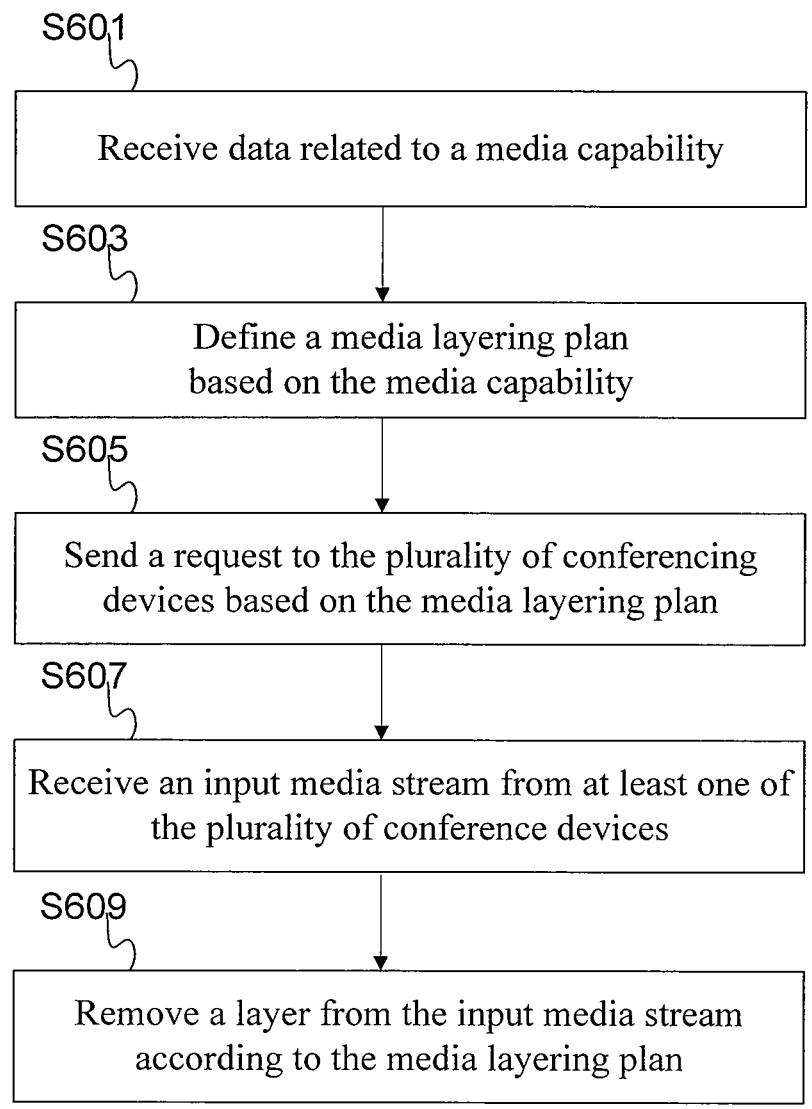
FIG. 6 illustrates a flow chart for negotiating media streams with multiple layers.

FIG. 6 illustrates a flow chart for negotiating media streams with multiple layers. At S601, the conference bridge 10 receives data related to a media capability of each of a plurality of conference devices (endpoints). At S603, the conference bridge 10 defines a media layering plan based on the media capability. At S605, the conference bridge 10 sends a request to the plurality of conferencing devices based on the media layering plan. As S607, the conference bridge 10 receives an input media stream from at least one of the plurality of conference devices. At S609, the conference bridge 10 removes a layer from the input media stream according to the media layering plan.

The H.264-SVC standard may be leveraged via the conference bridge 10 to provide a media conference to a heterogeneous mix of endpoints without the high cost imposed by traditional DSP-based MCU. The endpoints 20a-d generate a multi-layer stream which the conference bridge 10 can shape to match the capabilities of each of the other endpoints. For example, where there is a mix of QCIF, CIF and 4CIF endpoints, the 4CIF endpoint can encode a stream including a QCIF base layer plus enhancement layers. The QCIF endpoint will receive QCIF from all the other endpoints. The 4CIF endpoint will only receive QCIF from the QCIF endpoints but will also receive 4CIF from the other 4CIF endpoints.

Various embodiments described herein can be used alone or in combination with one another. The foregoing detailed description has described only a few of the many possible implementations of the present invention. For this reason, this detailed description is intended by way of illustration, and not by way of limitation.

We claim:

1. A method comprising:
   receiving, at a conference bridge, a plurality of media capabilities, the media capabilities comprising a media capability of each respective one of a plurality of conference devices in communication with the conference bridge, wherein the media capability indicates a video format that the respective one of the conference devices can encode and decode,
   designing, using the conference bridge, a media layering plan that is common to the conference devices, the media layering plan supports a combination of the media capabilities of the conference devices, and
   sending, using the conference bridge, a request to each respective one of the conference devices, wherein the request indicates an encoding scheme to use when the respective one of the conference devices is an active presenter, wherein the encoding scheme is based on the conference devices other than the respective one of the conference devices;
   receiving, at the conference bridge, an input media stream from an active presenter conference device included in the conference devices, wherein the input media stream includes media encoded consistent with the encoding scheme indicated by the request sent to the active presenter conference device by the conference bridge;
   converting, using the conference bridge, the input media stream into a plurality of output media streams, wherein each respective output media stream is associated with the respective one of the conference devices other than the active presenter conference device, and wherein each respective output media stream is converted to match the media capability of the respective one of the conference devices by removing a layer from the input media stream according to the media layering plan; and
   sending, using the conference bridge, each of the output media streams to the respective one of the conference devices other than the active presenter conference device.

2. The method of claim 1, wherein the media capability is selected from a group comprising resolution, processing power, display size, frame rate, video quality, bandwidth, and macroblock rate.

3. The method of claim 1, wherein a base layer of the media layering plan is defined by a lowest media capability of the plurality of conference devices.

4. The method of claim 3, wherein a top enhancement layer of the media layering plan is defined by a highest media capability shared by two or more of the plurality of conference devices.

5. The method of claim 4, wherein the input media stream from the active presenter conference device includes less than the media capability of the plurality of conference devices.

6. The method of claim 1, further comprising:
   sending a first output media stream, included in the plurality of output streams, comprising the input media stream with a media layer removed to a first conference device; and sending a second output media stream, included in the plurality of output streams, comprising the input media stream without the media layer removed to a second conference device.

7. The method of claim 1, wherein the media capability of the each respective conference device is a resolution selected from a group comprising of common intermediate format (CIF), quarter CIF, 4CIF, 16CIF, 720p, and 1080p.

8. The method of claim 1, further comprising:
adjusting the media layering plan according to a bandwidth of a connection of at least one of the conference devices.

9. An apparatus comprising:
a communication interface configured to send and receive data related to a media capability of each of a plurality of conference devices that are connected via a communication network for a conference session; and
a controller configured to:
determine, based on the media capability of each of the conference devices, a media layering plan that is common across the conference devices,
send a request to the conference devices, based on the media layering plan, to create media consistent with the media layering plan,
initiate the conference session and receive a first input media stream from a first conference device of the conference devices, the first conference device in active presenter mode, wherein the first input media stream includes a first media created by the first conference device, and wherein the first media is encoded consistent with the media layering plan,
receive a second input media stream from a second conference device of the conference devices, the second conference device in the active presenter mode, wherein the second input media stream includes a second media created by the second conference device, and wherein the second media is encoded consistent with the media layering plan
shape the first input media stream, based on the media layering plan, to generate a first output media stream for the second conference device, the first output media stream consistent with the media capability of the second conference device,
shape the second input media stream, based on the media layering plan, to generate a second output media stream for the first conference device, the second output media stream consistent with the media capability of the first conference device, and
send the first output media stream to the second conference device and the second output media stream to the first conference device.

10. The apparatus of claim 9, wherein the media capability is selected from a group comprising resolution, processing power, display size, frame rate, video quality, bandwidth, and macroblock rate.

11. The apparatus of claim 9, wherein a base layer of the media layering plan is defined by a lowest of the media capabilities of the plurality of conference devices.

12. The apparatus of claim 9, wherein the controller is configured to output a third output media stream comprising the first input media stream without a layer removed to a third conference device of the plurality of conference devices.

13. The apparatus of claim 9, wherein the plurality of media capabilities are resolutions selected from a group comprising of common intermediate format (CIF), quarter CIF, 4CIF, 16CIF, 720p, and 1080p.

14. Logic encoded in one or more non-transitory tangible media, the logic being executable by a processor and operable to:
receive data indicating media capability of each of a plurality of conference devices;
negotiate a media layering plan common for the conference devices based on the media capability of each of the conference devices, wherein the media layering plan includes combinations of layers for at least one of the conference devices as a function of the media capability of another one of the conference devices;
send a request to the conference devices based on the media layering plan, the request indicating an encoding scheme for output of each of the conference devices to be consistent with the media layering plan;
receive a first input media stream from a first conference device of the conference devices, the first input media stream comprising a first media created by the first conference device and wherein the first media is encoded consistent with the request received by the first conference device;
receive a second input media stream from a second conference device of the conference devices, the second input media stream comprising a second media created by the second conference device and wherein the second media is encoded consistent with the request received by the second conference device;
remove a layer from the first input media stream according to the media layering plan to obtain a first output media stream for the second conference device;
generate a second output media stream for the first conference device from the second input media stream; and
send the first output media stream to the second conference device and the second output media stream to the first conference device.

15. The logic of claim 14, wherein the media capability is selected from a group comprising resolution, processing power, display size, frame rate, video quality, bandwidth, and macroblock rate.

16. The logic of claim 14, wherein a base layer of the media layering plan is defined by a lowest of the media capabilities of the plurality of conference devices.

17. The logic of claim 16, wherein a top enhancement layer of the media layering plan is defined by a highest of the media capabilities shared by two or more of the plurality of conference devices.

18. The logic of claim 14, wherein the first input media stream includes less than all of the media capabilities of the at least one of the plurality of conference devices.

19. The logic of claim 14, further operable to:
send the first output media stream comprising the first input media stream without the layer removed to a third conference device.

20. The logic of claim 14, wherein the plurality of media capabilities are resolutions selected from a group comprising of common intermediate format (CIF), quarter CIF, 4CIF, 16CIF, 720p, and 1080p.

* * * * *